Dec. 2, 1941.  C. C. HORSTMAN ET AL  2,264,800
APPARATUS FOR MANUFACTURING WOUND CORES
Filed April 15, 1941  3 Sheets-Sheet 1
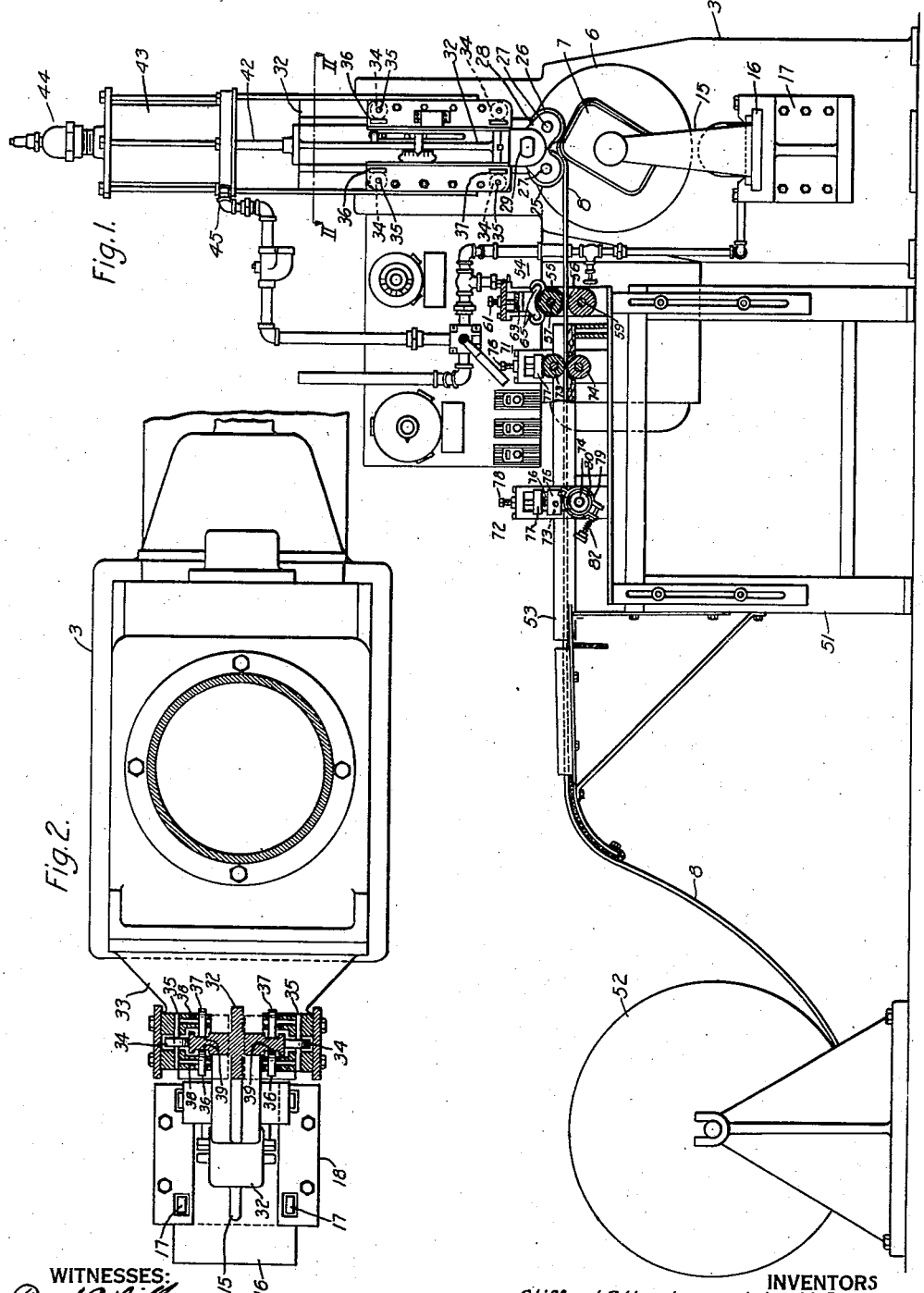
INVENTORS
Clifford C. Horstman, John H. Bramble
and Fred R. Miller
BY
Franklin E. Hardy
ATTORNEY Dec. 2, 1941.   C. C. HORSTMAN ET AL   2,264,800
APPARATUS FOR MANUFACTURING WOUND CORES
Filed April 15, 1941   3 Sheets-Sheet 3
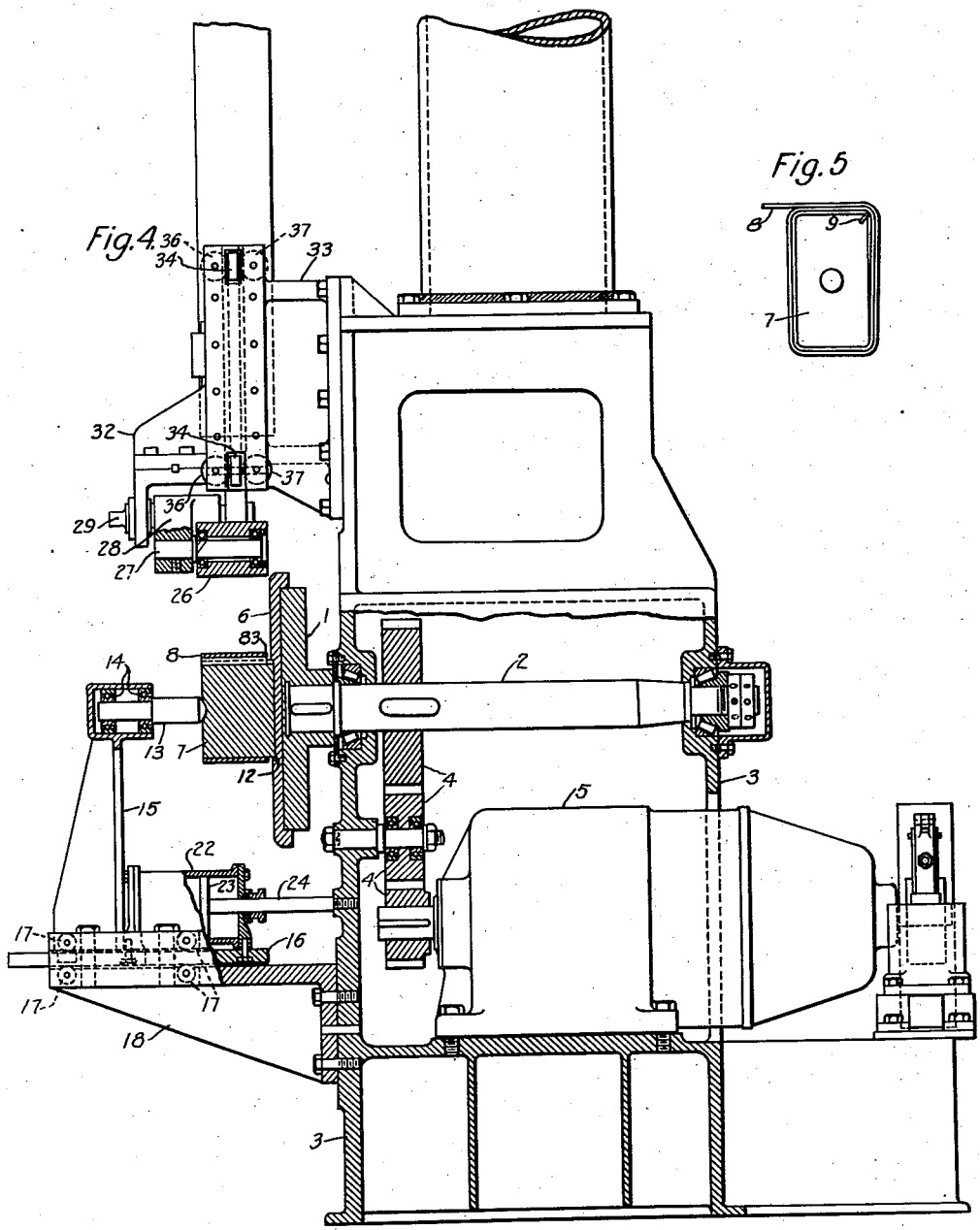
WITNESSES:
INVENTORS
Clifford C. Horstman, John H. Bramble
and Fred R. Miller
BY
  Franklin E. Hardy
    ATTORNEY Patented Dec. 2, 1941

2,264,800

UNITED STATES PATENT OFFICE 2,264,800

APPARATUS FOR MANUFACTURING WOUND CORES

Clifford C. Horstman and John H. Bramble, Sharpsville, Pa., and Fred R. Miller, Hartford, Ohio, assignors to Westinghouse Electric & Manufacturing Company, East Pittsburgh, Pa., a corporation of Pennsylvania Application April 15, 1941, Serial No. 388,638

11 Claims. (Cl. 242—78)

This invention relates to apparatus for manufacturing wound magnetic cores for induction apparatus such as transformers. Recent developments in magnetic steel have produced steels having good magnetic properties of low loss and high permeability in the direction in which the magnetic material is rolled during its process of manufacture. To obtain the maximum benefits from the use of such material, it is necessary to use it in such manner that the direction of the lines of magnetic flux or direction of magnetization of the steel coincides substantially with the direction of rolling the material during its process of manufacture.

Core structures have been developed in which the direction of magnetization coincides throughout with the direction of rolling by forming the core loop sections of a continuous strip or ribbon of steel that is slit to the proper width and wound on a mandrel of such shape as to give the desired window opening and to a predetermined thickness of the magnetic material. The core loop sections so formed are then annealed to relieve strains in the material caused by the winding operation. The core may then be further processed and the parts assembled about the copper conducting coils of the electric circuit. This further processing may consist essentially of impregnating the core with an adhesive bonding material and baking to bond the laminations or consecutive turns of the strip tightly together, cutting the core into parts, working the butt joint surfaces on opposite sides of the cut by grinding or machining and treating the surfaces to remove short-circuiting burrs at the joint.

It is an object of the invention to provide a machine for winding core loop structures of the above-indicated character that is fast in its winding operation, that will conform the strip exactly to the shape of the mandrel, and that will wind the core within very close tolerances of inside and outside dimensions to facilitate the use of form-wound coils.

It is a further object of the invention to provide a machine of the above-indicated character that will wind one layer of the magnetic strip material exactly upon the preceding layer so as to build the core up evenly with the edges of the successive turns in alignment.

It is a further object of the invention to provide a machine of the above-indicated character in which the space factor of the core may be controlled within certain desired limits.

It is a further object of the invention to provide a machine of the above-indicated character that is simple in operation, that will not harm or deform the strip during the winding process, and that will not harm the insulating coating provided on the strip.

Other objects and advantages of the invention will be apparent from the following description of one preferred embodiment thereof, reference being had to the accompanying drawings, in which:

Figure 1 is a side elevational view, partly in section, of a machine constructed in accordance with the invention;

Fig. 2 is a sectional view taken on lines II—II of Fig. 1;

Fig. 4 is a vertical end view, partly in section; and

Fig. 5 is a detail.

Figure 3:
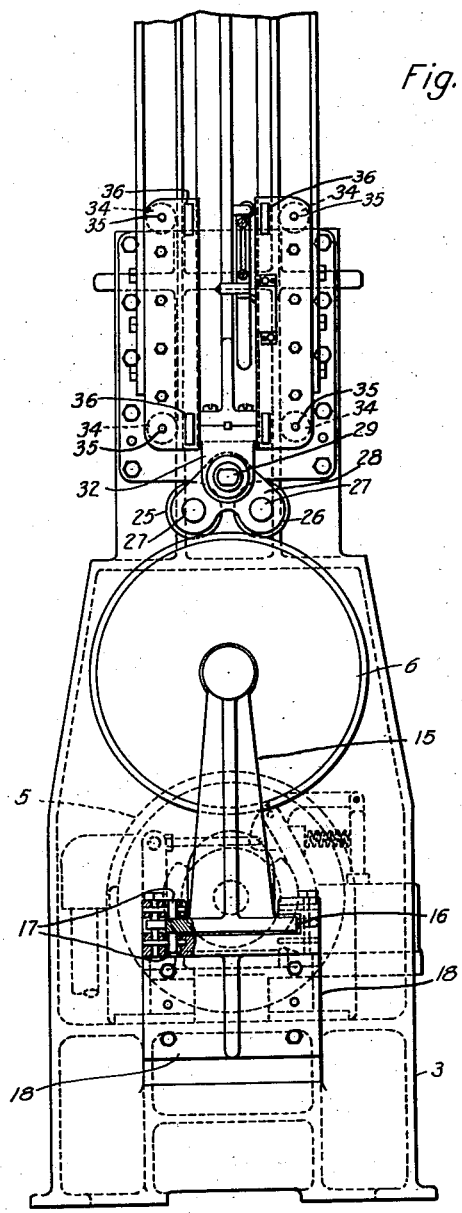
Fig. 3 is an enlarged view of a part of Fig. 1.

Referring to the drawings, and particularly to Figs. 1 and 4, a winding head 1 is provided mounted on a shaft 2 that is supported in the machine frame 3 and is connected by a chain of gears 4 to be driven by an electric motor 5. A face plate 6 is provided on the head 1 upon which a mandrel 7, corresponding in shape to the window of the core to be wound, is attached and about which the continuous strip 8 of magnetic material is wound. A slot is provided in one corner of the mandrel onto which the end 9 of the strip may be positioned at the start of the winding operation, as best shown in Fig. 5. The mandrel is formed wider than the strip of material to be wound and its inner face is inserted into a recess 12 (see Fig. 4) formed in the face plate 6 having an outline corresponding to the outline of the mandrel, so as to provide means for rotating the mandrel on its axis as the winding head is revolved. A hydraulic ram is provided having a pressure member 13 for engaging the mandrel and exerting sufficient force during the winding operation to insure that the mandrel remains within the recess 12 in the face plate 6. The contact pressure member 13 is carried in bearings 14 at the upper end of a frame member 15, the lower end of which is attached to a bed plate 16 that is mounted between upper and lower rollers 17 carried by a bracket supporting member 18 attached to and extending outwardly from the frame 3. A cylinder 22 is provided that is attached to the bed plate 16 in which is positioned a piston 23 that is attached by a piston rod 24 to the main frame 3. By introducing compressed air into the cylinder 22 at the left of the piston 23, as viewed in Fig. 4, the hydraulic ram consisting

one end of a mandrel, biasing means for engaging the other end of the mandrel for preventing its release from the depression during the winding operation, power means for driving the head for winding consecutive turns of a continuous strip of magnetic material on the mandrel, two follower rolls for engaging the strip during the winding operation, means for supporting the rolls comprising a carriage movable directly away from and toward the mandrel, and a member pivotally mounted on the carriage for supporting said rolls to apply pressure to the strip along lines of pressure on opposite sides of the axis of rotation of the mandrel.

4. In a machine for forming magnetic core loops from a continuous strip of magnetic sheet material, the combination comprising a winding head having a depression therein for receiving one end of a mandrel, biasing means for engaging the other end of the mandrel along its axis of rotation for preventing its release from the depression during the winding operation, power means for driving the head for winding consecutive turns of a continuous strip of magnetic material on the mandrel, two follower rolls for engaging the strip during the winding operation, means for supporting the rolls comprising a carriage movable directly away from and toward the mandrel, and a member pivotally mounted on the carriage for supporting said rolls to apply pressure to the strip along lines of pressure on opposite sides of the axis of rotation of the mandrel, a compressed air cylinder having a piston therein for acting on said carriage for maintaining a desired pressure on said strip and for raising said rolls from engagement with said strip.

5. In a machine for forming magnetic core loops from a continuous strip of magnetic sheet material, the combination comprising a winding head having a depression for receiving one end of a mandrel, biasing means for engaging the other end of the mandrel along its axis of rotation for preventing its release from the depression during winding, power means for driving the head for winding consecutive turns of a continuous strip of magnetic material on the mandrel, two follower rolls for engaging the strip during winding, means for supporting the follower rolls comprising a carriage movable directly away from and toward the mandrel, and a member pivotally mounted on the carriage for supporting said rolls to apply pressure to the strip along lines of movement on opposite sides of the axis of rotation of the mandrel, a compressed air cylinder having a piston therein for acting on said carriage for maintaining a desired pressure on said strip and for raising said rolls from engagement with said strip, and guide means for embracing and guiding the edges of the strip as it approaches the mandrel so as to position each layer on the preceding layer as it is being wound with the edges of the successive turns of the strip in alignment.

6. In a machine for forming magnetic core loops from a continuous strip of magnetic sheet material, the combination comprising a winding head having a depression for receiving one end of a mandrel, biasing means for engaging the other end of the mandrel along its axis of rotation for preventing its release from the depression during winding, power means for driving the head for winding consecutive turns of a continuous strip of magnetic material on the mandrel, two follower rolls for engaging the strip during winding, means for supporting the follower rolls comprising a carriage movable directly away from and toward the mandrel, and a member pivotally mounted on the carriage for supporting said rolls to apply pressure to the strip along lines of movement on opposite sides of the axis of rotation of the mandrel, a compressed air cylinder having a piston therein for acting on said carriage for maintaining a desired pressure on said strip and for raising said rolls from engagement with said strip, guide means for guiding the strip as it approaches the mandrel so as to position each layer on the preceding layer as it is being wound with the edges of the successive turns of the strip in alignment along an even surface, comprising side plates for engaging the edges of the strip, rolls on opposite sides of the strip, means for biasing the rolls into engagement with the strip, and means for braking the rolls to maintain tension on the strip while it is being wound.

7. In a machine for forming magnetic core loops from a continuous strip of magnetic sheet material, the combination comprising a winding head having a depression for receiving one end of a mandrel, biasing means for engaging the other end of the mandrel for preventing its release from the depression during the winding operation, power means for driving the head for winding consecutive turns of a continuous strip of magnetic material on the mandrel, two follower rolls for engaging the strip during the winding operation, means for supporting the rolls comprising a carriage movable directly away from and toward the mandrel, and a member pivotally mounted on the carriage for supporting said rolls to apply pressure to the strip in directions past opposite sides of the axis of rotation of the mandrel, and guide means for embracing and guiding the edges of the strip as it approaches the mandrel so as to position each layer on the preceding layer as it is being wound with the edges of the successive turns of the strip in alignment.

8. In a machine for forming magnetic core loops from a continuous strip of magnetic sheet material, the combination comprising a winding head having a depression therein for receiving one end of a mandrel, biasing means for engaging the other end of the mandrel for preventing its release from the depression during winding, power means for driving the head for winding consecutive turns of a continuous strip of magnetic material on the mandrel, two follower rolls for engaging the strip during winding, means for supporting the rolls comprising a carriage movable directly away from and toward the mandrel, and a member pivotally mounted on the carriage for supporting said rolls to apply pressure to the strip along lines on opposite sides of the axis of rotation of the mandrel, guide means for guiding the strip as it approaches the mandrel so as to position each layer on the preceding layer as it is being wound with the edges of the successive turns of the strip in alignment along an even surface, comprising side plates for engaging the edges of the strip, rolls on opposite sides of the strip, means for biasing the rolls into engagement with the strip, and means for braking the rolls to maintain tension on the strip while it is being wound.

9. In a machine for forming magnetic core loops from a continuous strip of magnetic sheet material, the combination comprising a winding head having a depression therein for receiving one end of a mandrel, biasing means for engaging the other end of the mandrel for preventing its release from the depression during winding, power means for driving the head for winding consecutive turns of a continuous strip of magnetic material on the mandrel, two follower rolls for engaging the strip during winding, means for supporting the rolls comprising a carriage movable directly away from and toward the mandrel, and a member pivotally mounted on the carriage for supporting said rolls to apply pressure to the strip along lines on opposite sides of the axis of rotation of the mandrel, deburring rolls positioned to remove any burr present on the edge of the strip while it passes forward to be wound about the mandrel.

10. In a machine for forming magnetic core loops from a continuous strip of magnetic sheet material, the combination comprising a winding head having a depression therein for receiving one end of a mandrel, biasing means for engaging the other end of the mandrel for preventing its release from the depression during winding, power means for driving the head for winding consecutive turns of a continuous strip of magnetic material on the mandrel, two follower rolls for engaging the strip during winding, means for supporting the rolls comprising a carriage movable directly away from and toward the mandrel, and a member pivotally mounted on the carriage for supporting said rolls to apply pressure to the strip along lines on opposite sides of the axis of rotation of the mandrel, deburring rolls positioned to remove any burr present on the edge of the strip while it passes forward to be wound about the mandrel, and guide means for embracing and guiding the edges of the strip as it approaches the mandrel so as to position each layer on the preceding layer as it is being wound with the edges of the successive turns of the strip in alignment.

11. In a machine for forming magnetic core loops from a continuous strip of magnetic sheet material, the combination comprising a winding head having a depression therein for receiving one end of a mandrel, biasing means for engaging the other end of the mandrel for preventing its release from the depression during winding, power means for driving the head for winding consecutive turns of a continuous strip of magnetic material on the mandrel, two follower rolls for engaging the strip during winding, means for supporting the rolls comprising a carriage movable directly away from and toward the mandrel, a member pivotally mounted on the carriage for supporting said rolls to apply pressure to the strip along lines on opposite sides of the axis of rotation of the mandrel, deburring rolls positioned to remove any burr present on the edge of the strip while it passes forward to be wound about the mandrel, guide means for guiding the strip as it approaches the mandrel so as to position each layer on the preceding layer as it is being wound with the edges of the successive turns of the strip in alignment comprising side plates for engaging the edges of the strip, rolls on opposite sides of the strip, means for biasing the rolls into engagement with the strip, and means for braking the rolls to maintain tension on the strip while it is being wound.

CLIFFORD C. HORSTMAN.
JOHN H. BRAMBLE.
FRED R. MILLER.